United States Patent [19]

Scardapane

[11] 4,301,598
[45] Nov. 24, 1981

[54] SINGLE FACED CORRUGATED WEB THICKNESS SENSING APPARATUS

[75] Inventor: Anthony N. Scardapane, Pennsauken, N.J.

[73] Assignee: Molins Machine Company, Inc., Cherry Hill, N.J.

[21] Appl. No.: 152,942

[22] Filed: May 23, 1980

[51] Int. Cl.³ .............................................. G01B 5/06
[52] U.S. Cl. .................................................. 33/147 L
[58] Field of Search ........... 73/159; 33/147 L, 147 N, 33/172 F

[56] References Cited

U.S. PATENT DOCUMENTS

| | | | |
|---|---|---|---|
| 2,713,209 | 7/1955 | Brown | 33/147 L |
| 2,876,734 | 3/1959 | Nitchie | |
| 3,520,276 | 7/1970 | Martin | |
| 4,189,841 | 2/1980 | Loepfe | 33/147 N |
| 4,253,913 | 3/1981 | Chaudhuri | 73/159 |

FOREIGN PATENT DOCUMENTS 2058101  6/1972  Fed. Rep. of Germany ........ 73/159

*Primary Examiner*—S. Clement Swisher
*Attorney, Agent, or Firm*—Seidel, Gonda, Goldhammer & Panitch

[57] ABSTRACT

The thickness of a single faced corrugated web is sensed by a flexible resilient member in contact with the corrugated side of the web while the smooth side of the web is in contact with a preheat drum. A frame is supported for movement toward and away from the drum and has said resilient member mounted thereon for contacting a plurality of adjacent corrugations and a sensing member which is movable in response to the contact member. A sensor cooperates with the sensing member to generate a signal.

10 Claims, 4 Drawing Figures

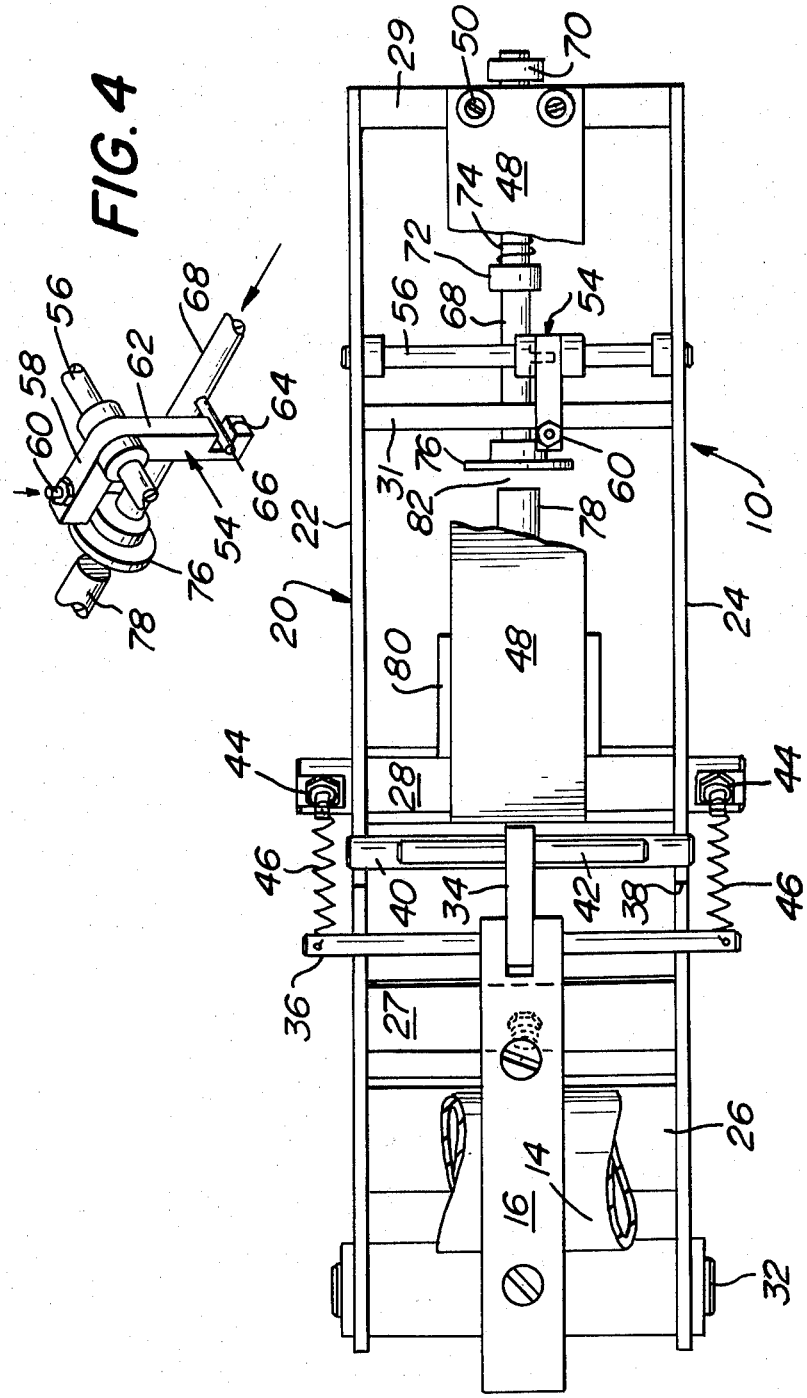

SINGLE FACED CORRUGATED WEB THICKNESS SENSING APPARATUS

BACKGROUND

Single faced corrugated paperboard webs are made on a single facer machine. A liner is attached to the crests of the corrugations to form double faced corrugated paperboard at a glue machine. At the glue machine, the web passes between an adhesive applicator roll and a rider roll. The amount by which the rider roll compresses the corrugations establishes the amount of adhesive applied. Accordingly, the rider roll must be ballasted to apply either a constant predetermined pressure or to maintain a constant predetermined gap between itself and the adhesive applicator roll.

The effective pressure can be maintained either by a pressure control arrangement as described in U.S. Pat. No. 2,876,734 or by monitoring the gap between the rider roll and the adhesive applicator roll. To maintain a uniform gap so that slight compression of the single face occurs as it passes between the rolls, the thickness of the web must be sensed. Thus, there is need for sensing apparatus capable of acting on the corrugated side of the web for measuring the thickness of the web as the web is moving at high speed so that appropriate adjustments and/or stopping of the web can be attained. The flexibility, the ease of deformation and the undulated nature of the corrugated side of the web complicate the problems in designing suitable sensing apparatus.

SUMMARY OF THE INVENTION

The apparatus of the present invention is particularly adapted for sensing thickness of single faced corrugated paperboard. The apparatus includes a support frame which is biased for movement toward and being movable away from a web guide surface. The guide surface is adapted to be in contact with the smooth side of a web of single face corrugated paperboard.

A contact member is supported on said frame and arranged to simultaneously contact a plurality of adjacent corrugations on the web while the web is in contact with the guide surface. The contact member is movable in a direction away from the guide surface as a function of thickness of the web. A sensing member is movably supported by the frame and is responsive to movement of the contact member. The sensing member is adapted to cooperate with a thickness sensor capable of generating a signal. The sensing member has two extreme positions and is biased toward one of them.

It is an object of the present invention to provide apparatus for sensing the thickness of single faced corrugated paperboard in a manner which is simple, reliable and easy to maintain.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a top plan of the sensing apparatus in its operative position.

FIG. 4 is a partial perspective view of the apparatus showing details of the sensing member.

DETAILED DESCRIPTION

Figure 1:
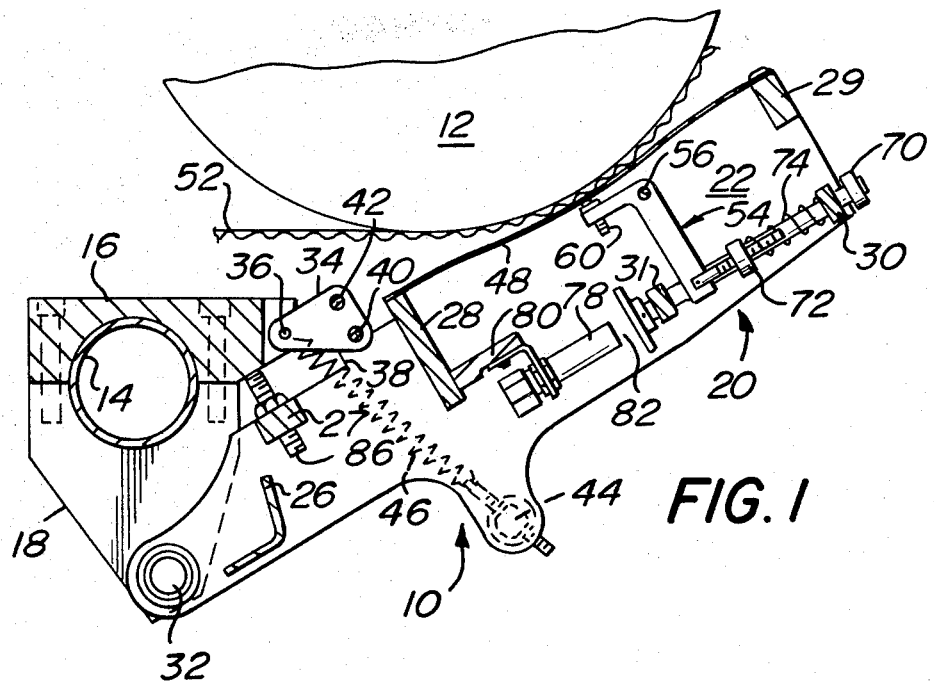
FIG. 1 is a sectional view showing apparatus of the present invention juxtaposed to the periphery of a preheat drum.

Referring to the drawings in detail, wherein like numerals indicate like elements, there is shown in FIG. 1 apparatus 10 in accordance with the present invention in an operative position juxtaposed to a preheat drum 12. The drum 12 has a smooth guide surface on its outer periphery and may be preheated in any convenient manner such as by steam. The apparatus 10 is supported adjacent to the drum 12 in any convenient manner by way of a support structure.

For purposes of illustration, the support structure is a pipe 14 which extends parallel to the drum 12 and is supported at its ends in any convenient manner so as to be transverse to the direction of movement of the web. A pair of mating collars 16 and 18 are clamped to the pipe 14 in an adjustable manner so as to facilitate the ease of installation, the ease of maintenance, and to facilitate adjustment of the apparatus 10 along the pipe 14. Thus, the apparatus 10 may be positioned along the center line of the web, along a side edge portion of the web and/or a pair of sensing apparatuses may be mounted on a single pipe 14 for generating a pair of signals indicative of web thickness.

A frame 20 is pivotably connected to collar 18. The frame 20 includes parallel side frame members 22 and 24 rigidly interconnected by transverse struts 26, 27, 28, 29, 30, and 31. The frame 20 is pivotably connected to collar 18 by way of pin 32 whose axis is horizontally disposed.

Figure 2:
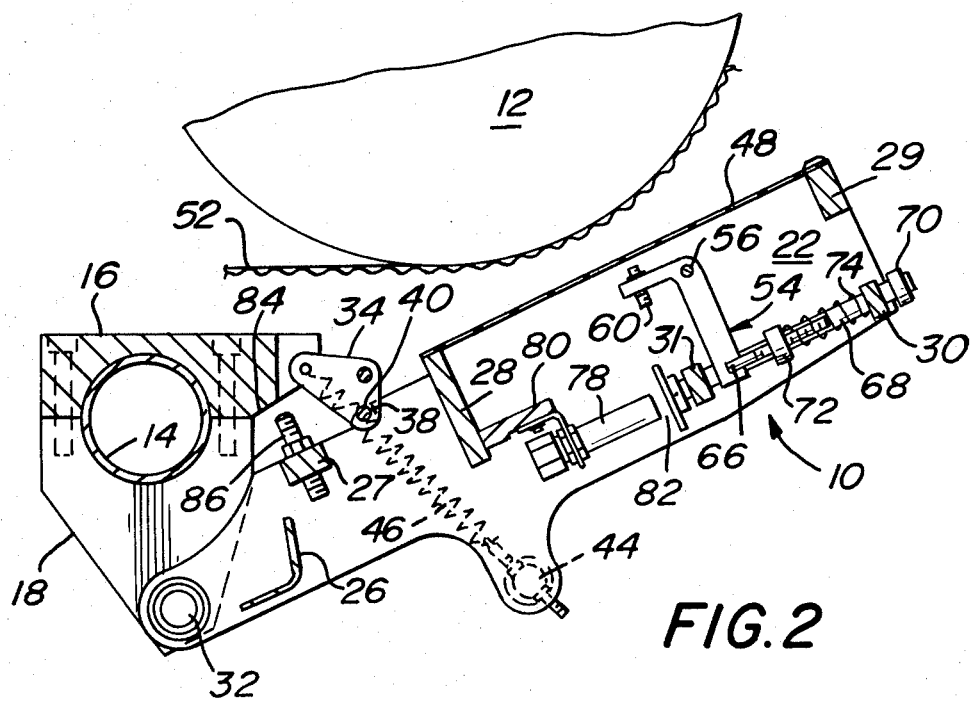
FIG. 2 is a view similar to FIG. 1 but showing the sensing apparatus in an inoperative position.

The frame 20 has an operative position with respect to the drum 12 as shown in FIG. 1 and an inoperative position as shown in FIG. 2. Such positions may be attained in any one of a wide variety of manners. The preferred interrelationship includes the provision of a latch 34 which is pivotably connected to a rod 36 at a clevis in the collar 16. Rod 36 is longer than the transverse width of the frame 20 as will be apparent from FIG. 3. The side frame members 22 and 24 are provided with a shoulder 38. Latch 34 supports a pin member 40 which may ride on the top surface of the side frame members 22, 24 in the operative position of the frame 20 as shown in FIG. 1. In the inoperative position of the frame 20 as shown in FIG. 2, pin member 40 engages the shoulders 38. Manipulation of the latch 34 may be attained by way of a handle 42 which projects to either side of the latch 34 as shown more clearly in FIG. 3.

The frame 20 is biased to the position shown in FIG. 1 in any convenient manner. A preferred manner for biasing the frame 20 includes a pair of coil springs 46. Each spring is attached at one end to one end of the rod 36. The other end of each spring is connected to an adjustable pivot 44 projecting outwardly from the side faces of the side frame members 22, 24. See FIG. 3. In this manner, the tension on the springs 46 is adjustable and pivotable.

A contact member 48 is provided for contact with a plurality of adjacent corrugations on the corrugated side of the single faced web 52 of corrugated paperboard. Member 48 is preferably a flexible resilient material such as stainless steel having a substantial width as shown in FIG. 3 and connected only at one end to the frame 20 by way of fasteners 50. The other end of the contact member 48 is free and overlies the strut 28.

A sensing member 54 is provided for responding to movements of the contact member 48. The sensing member 54 is preferably an L-shaped arm pivotable about the axis of transverse pin 56 and having legs 58, 62. Leg 58 has an adjustment screw 60 which contacts the member 48. Leg 62 is provided with a notch adjacent the free end thereof. A pin 66 has one end portion disposed within the notch 64 and its other end portion fixedly secured to a shaft 68.

The shaft 68 is guided for movement along its longitudinal axis by way of the struts 30, 31. Stop collars 70, 72 are adjustable on the shaft 68. Stop collar 70 limits the extreme position to which the shaft 68 may move in a direction from right to left in FIG. 3 since collar 70 will contact the strut 30. A spring 74 extends between the strut 30 and the collar 72. Spring 74 biases the shaft 68 from right to left in FIG. 3 thereby causing the sensing member 54 to pivot in a clockwise direction in FIGS. 1 and 2 about the pin 56.

An enlarged head 76 is provided on the lefthand end of the shaft 68. The end face of head 75 is flat and spaced from a sensor 78. Sensor 78 is supported from the strut 28 by way of the bracket 80. A gap 82 is provided between the head 76 and the sensor 78. Sensor 78 is a proximity sensor which is commercially available and generates a signal as a function of the width of the gap 82. The proximity sensor 78 is only one form of a sensor which may be used to generate a signal as a function of the position of head 76. The signal generated may be an audible alarm, a visual alarm, and/or a signal which could be used to stop the movement of the web 52.

The operative position of the frame 20 as shown in FIG. 1 may be accurately adjusted, so as not to crush the web 52, by means of a limit stop in the form of a machined surface 84 on a lower face of the collar 16 and an adjustable screw 86 on the strut 27. See FIGS. 1 and 2.

The head 76 and shaft 68 are biased to one position. If leg 58 of sensor 54 were on the other side of the pin 56 from that shown, spring 74 would bias shaft 68 in an opposite direction. Head 76 could cooperate with other types of sensors including photocells, potentiometers, etc. The delicate sensitivity needed is attained by a number of adjustments including screw 86, screw 60 and the position of collar 72. In order to prevent the shaft 60 from rotating about its longitudinal axis, it is preferably provided with at least one flat for cooperation with a mating hole in the strut 31 whose configuration matches that of the cross-section of the shaft 68. Alternatively, a key and keyway may be utilized to assure that the shaft 68 does not rotate about its longitudinal axis.

Thus, it will be seen that the structural interrelationship set forth above and illustrated in the drawings is simple and reliable while being capable of performing the difficult chore of sensing the thickness of a web of single faced corrugated paperboard by contact with the corrugated face thereon.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for sensing the thickness of a moving web of single faced corrugated paperboard comprising a cylindrical drum having an outer surface for guiding contact with the smooth side of single faced corrugated paperboard, a support frame biased for movement toward and away from said drum, means including a contact member supported on said frame and arranged so that a portion thereof simultaneously contacts a plurality of adjacent corrugations on a web of single faced corrugated paperboard while the web is in contact with the drum adjacent said frame, said contact member being resilient and smooth on the face thereof juxtaposed to said drum, at least said portion of said contact member being movable in a direction away from said drum as a function of thickness of the web, a sensing member movably supported by the frame and responsive to movement of said contact member, said sensing member being adapted to cooperate with a sensor capable of generating a signal as a function of the relative position with respect to said sensing member, and means biasing said sensing member to a position wherein it is directly responsive to movements of said contact member.

2. Apparatus in accordance with claim 1 including means pivotably mounting said frame for movement between an operative position adjacent the drum and an inoperative position spaced from the drum, and a latch means for latching the frame in the inoperative position.

3. Apparatus in accordance with claim 1 wherein said sensing member is pivotably supported by the frame and is an L-shaped arm having first and second legs, an adjustable member on one of said legs for direct contact with said contact member, said biasing means for biasing said sensing member being coupled to the other leg.

4. Apparatus in accordance with claim 1 including means for adjusting the effect of said biasing means, means for adjusting the distance between the frame and the periphery of said drum, and means for adjusting the position of the sensing member relative to said contact member.

5. Apparatus in accordance with claim 1 wherein said sensing member is a flat resilient blade anchored at only one end on the frame and having a width which is substantially greater than its thickness.

6. Apparatus in accordance with claim 1 including said frame being movable relative to the drum between operative and inoperative positions, and means for interrupting direct physical contact between said sensing member and said contact member when the frame is in its inoperative position.

7. Apparatus for use in connection with the sensing of the thickness of single faced corrugated paperboard comprising a support frame adapted for movement toward and away from a guide surface which is adapted to contact the smooth side of a web of single faced corrugated paperboard, a flat contact member supported on said frame and arranged to simultaneously contact a plurality of adjacent corrugations on a web of single faced corrugated paperboard while the web is in contact with a guide surface, said contact member being movable by assuming a curved configuration as a function of thickness of the web, and a sensing member supported by the frame, said sensing member being movable in response to the curved configuration assumed by said contact member and the position thereof, said sensing member being adapted to cooperate with a sensor capable of generating a signal in response to the relative position of said sensing member, and means for adjusting the relative position of said sensing member with respect to said contact member.

8. Apparatus in accordance with claim 7 wherein said contact member is secured to said frame at only one end with the other end being freely supported by the frame.

9. Apparatus in accordance with claim 7 including adjustable means on the frame for adjusting the position of said frame relative to a support.

10. A method of sensing thickness of a corrugated web comprising:
 (a) contacting the smooth side of a single faced web with a curved guide surface,
 (b) flexing a resilient contact member so that a curved portion thereof is in contact with a plurality of adjacent corrugations on the opposite side of the web adjacent said guide surface,
 (c) biasing said contact member in a manner which tends to flatten out said curved portion, and
 (d) engaging said curved portion with a sensing member adapted to cooperate with a sensor capable of generating a signal.

* * * * *